US008335485B2

(12) United States Patent
Tuohino et al.

(10) Patent No.: US 8,335,485 B2
(45) Date of Patent: Dec. 18, 2012

(54) CALL ROUTING

(75) Inventors: Markku Ahti Tuohino, Espoo (FI); Lauri Kalevi Lahtinen, Espoo (FI)

(73) Assignee: Nokia Corporation, Espoo (FI)

(*) Notice: Subject to any disclaimer, the term of this patent is extended or adjusted under 35 U.S.C. 154(b) by 1224 days.

(21) Appl. No.: 12/137,485

(22) Filed: Jun. 11, 2008

(65) Prior Publication Data

US 2009/0310758 A1 Dec. 17, 2009

(51) Int. Cl.
*H04M 11/04* (2006.01)
(52) U.S. Cl. .......... 455/404.2; 455/445; 455/432.1; 370/352; 370/356; 379/45
(58) Field of Classification Search .......... 455/445, 455/404.1–404.2, 433; 379/37, 45; 370/352–356
See application file for complete search history.

(56) References Cited

U.S. PATENT DOCUMENTS

| 7,606,556 | B2* | 10/2009 | Poikselka et al. | 455/404.2 |
| 8,040,862 | B1* | 10/2011 | Rosenberg et al. | 370/338 |
| 8,040,905 | B2* | 10/2011 | Yang | 370/401 |
| 8,254,872 | B2* | 8/2012 | Liebhart | 455/404.1 |
| 2007/0060097 | A1* | 3/2007 | Edge et al. | 455/404.1 |
| 2007/0149166 | A1* | 6/2007 | Turcotte et al. | 455/404.1 |
| 2009/0280770 | A1* | 11/2009 | Mahendran | 455/404.1 |
| 2011/0165856 | A1* | 7/2011 | You et al. | 455/404.1 |
| 2012/0083240 | A1* | 4/2012 | Patel | 455/404.2 |

* cited by examiner

*Primary Examiner* — Sharad Rampuria
(74) *Attorney, Agent, or Firm* — Harrington & Smith

(57) ABSTRACT

Embodiments provide a method and apparatus wherein a proxy control function may forward an emergency session to a serving control function, the serving control function forwarding the session to a default emergency control function. The default emergency control function may return an address or identity of an emergency control function or may forward the session to an emergency control function.

20 Claims, 5 Drawing Sheets

CALL ROUTING

FIELD OF TECHNOLOGY AND BACKGROUND

The invention generally relates to communication, network elements, methods, apparatuses, systems and programs of or for routing of session requests or calls of a specific type such as emergency calls.

At least one or more embodiments of the invention relate to call support, e.g. emergency call support, in an internet protocol based system such as e.g. a multimedia subsystem. As an example, embodiments may be applied to an internet protocol multimedia subsystem, IMS, according to release 7, R7 IMS, or to any other type of system or release number. An example of IMS R7 emergency call support is described in standard.

As an example, when assuming that a user is always using a proxy call state control function, P-CSCF, in a visited network, a normal session control, e.g. an IMS session control, of a serving entity such as a serving call state control function may not be utilised. An emergency call state control function, E-CSCF, of a visited network may be provided for handling and routing emergency calls.

Yet not all access networks may have such an E-CSCF functionality available. Further, a terminal such as a mobile phone, personal digital assistant etc, may not be capable of handling an emergency call differently from any other call.

SUMMARY

In accordance with at least one or more embodiments, an apparatus may comprise
 a processor configured to receive from a proxy apparatus a session request for initiating an emergency session pertaining to a device in a visited network for which the apparatus is a home network apparatus, and determine or select a default emergency control function or apparatus in the visited network, and
 a sender configured to send an emergency session request, or forward the emergency session request, to the default emergency control function or apparatus.

The processor may e.g. be configured to receive the session request from a proxy apparatus in a home network of the device.

In another embodiment the processor may e.g. be configured to receive the session request from a proxy apparatus in the visited network of the device.

The session request may be an emergency session request or emergency call request.

The apparatus may comprise at least one or more of:
 the apparatus is at least one of a serving control function or apparatus, a serving function or apparatus of an internet protocol multimedia subsystem, a serving call state control function, or a part, module or chipset of a serving control function,
 the apparatus is configured to receive the session request from a proxy control function or proxy call state control function.

In accordance with one or more embodiments of the invention, an apparatus may comprise a processor configured to receive an emergency session or call request for initiating an emergency session or emergency call pertaining to a device in a visited network, and a sender configured to forward the emergency session or call request to a serving control function or apparatus.

The apparatus may comprise at least one or more of:
 the apparatus is at least one of a proxy control function or apparatus, a proxy function or apparatus of an internet protocol multimedia subsystem, a proxy call state control function, or a part, module or chipset of a proxy control function or proxy call state control function.

In accordance with one or more embodiments of the invention, an apparatus may comprise a processor configured to receive a session request for initiating an emergency session, and determine or select an emergency control function or apparatus, and a sender configured to return a message or session request indicating an emergency control function or apparatus, or forward the session request to an emergency control function or emergency call state control function.

The apparatus may comprise at least one or more of:
 the apparatus is at least one of a default control function or apparatus, a default function or apparatus of an internet protocol multimedia subsystem, a default emergency call state control function, or a part, module or chipset of an emergency control function or apparatus, In accordance with one or more embodiments of the invention, a method is provided which comprises
 receiving a session request for initiating a session of a specific type, and
 either determining or selecting a default control function or apparatus, and sending a session request, or forwarding the session request, to the default control function or apparatus; or
 forwarding the session request to a serving control function or apparatus in case the session request is an emergency session or emergency call request; or
 determining or selecting an emergency control function or apparatus, and returning a message or session request indicating an emergency control function or apparatus, or forwarding the session request to an emergency control function or emergency call state control function.

In accordance with one or more embodiments of the invention, a method may comprise at least one or more, in any arbitrary combination, of:
 a proxy control function, or proxy call state control function, forwards an emergency session to a home serving control function, or a home serving call state control function;
 the home serving control function or home serving call state control function, executes emergency service related initial filter criteria;
 the home serving control function, or home serving call state control function, forwards the session to an emergency control function, an emergency call state control function, a default emergency control function, or a default emergency call state control function;
 the default emergency control function or default emergency call state control function returns an address or identity of an emergency control function or emergency call state control function;
 the serving call state control function or serving call state control function sends an emergency session request to the emergency control function or emergency call state control function indicated by the returned address or identity;
 the default emergency control function or default emergency call state control function selects an emergency control function or emergency call state control function and forwards the session to the selected emergency control function or emergency call state control function.

In accordance with one or more embodiments of the invention, a method may comprise at least one or more, in any arbitrary combination, of:
 a proxy call state control function receives, from a user equipment, a message, e.g. an INVITE message, with an emergency indication, the message optionally containing location information of the user equipment;

the proxy call state control function forwards the message to a serving call state control function in an internet protocol multimedia subsystem network or home internet protocol multimedia subsystem network;

the proxy call state control function adds an address of the emergency call state control function to the message;

the proxy call state control function adds the emergency call state control function from the same network with proxy call state control function;

the serving call state control function executes originating services for a user;

the serving call state control function takes into account the fact that the session is for emergency, and executes the services in different manner than for regular sessions;

the serving call state control function then determines an address of the emergency call state control function;

in case the proxy call state control function has added the address of the emergency call state control function to the message sent to the serving call state control function, the serving call state control function uses this address;

in case there is no address of an emergency call state control function in the message sent from the proxy call state control function, the serving call state control function uses the location of the user equipment to determine the address of the emergency call state control function or an entry point to an alternative internet protocol multimedia subsystem core network where the emergency call state control function is located;

in case the serving call state control function is not able to determine the alternative internet protocol multimedia subsystem core network, the serving call state control function uses the emergency call state control function from the home internet protocol multimedia subsystem core network;

the emergency call state control function optionally verifies any location information from user equipment and optionally obtains additional location information;

based on this location information, the message or an invite message is sent to a media gateway control function or media gateway;

an initial address message is continued towards an emergency centre or public safety answering point;

a message or an invite message is sent directly to the emergency centre or public safety answering point;

the emergency call establishment is completed;

in case the emergency call state control function is not able to determine the public safety answering point address, the emergency call state control function rejects the emergency session request by sending a response message with a request for the user equipment to perform an internet protocol multimedia subsystem emergency registration In accordance with one or more embodiments of the invention a system may comprise at least one or more, in any arbitrary combination, of:

a proxy call state control function configured to receive, from a user equipment, a message, e.g. an invite message, with an emergency indication, the message optionally containing location information of the user equipment;

the proxy call state control function configured to forward the message to a serving call state control function in an internet protocol multimedia subsystem network or home internet protocol multimedia subsystem network;

the proxy call state control function configured to add an address of the emergency call state control function to the message;

the proxy call state control function configured to add the emergency call state control function from the same network with proxy call state control function;

the serving call state control function configured to execute originating services for a user;

the serving call state control function configured to take into account the fact that the session is for emergency, and execute the services in a manner different from regular sessions;

the serving call state control function configured to determines an address of the emergency call state control function;

in case the message received from the proxy call state control function comprises the address of the emergency call state control function, the serving call state control function is configured to use this address;

in case there is no address of an emergency call state control function in the message from the proxy call state control function, the serving call state control function is configured to use the location of the user equipment to determine the address of the emergency call state control function or an entry point to an alternative internet protocol multimedia subsystem core network where the emergency call state control function is located;

in case the serving call state control function is unable to determine the alternative internet protocol multimedia subsystem core network, the serving call state control function is configured to use the emergency call state control function from the home internet protocol multimedia subsystem core network;

the emergency call state control function is optionally configured to verify any location information from user equipment and optionally obtain additional location information;

based on this location information, the system is configured to send a message or an invite message to a media gateway control function or media gateway;

the system is configured to continue an initial address message towards an emergency centre or public safety answering point;

the system is configured to send a message or an invite message directly to the emergency centre or public safety answering point;

the system is configured to complete the emergency call establishment;

in case the emergency call state control function is unable to determine the public safety answering point address, the emergency call state control function is configured to reject the emergency session request by sending a response message with a request for the user equipment to perform an internet protocol multimedia subsystem emergency registration.

In accordance with one or more embodiments of the invention a computer program is provided, comprising code means configured to carry out or implement, when run on a processor, a method comprising at least one or more, in any arbitrary combination, of:

a proxy control function, or proxy call state control function, forwards an emergency session to a home serving control function, or a home serving call state control function;

the home serving control function or home serving call state control function, executes emergency service related initial filter criteria;

the home serving control function, or home serving call state control function, forwards the session to an emergency control function, an emergency call state control function, a default emergency control function, or a default emergency call state control function;

the default emergency control function or default emergency call state control function returns an address or identity of an emergency control function or emergency call state control function;

the serving call state control function or serving call state control function sends an emergency session request to the emergency control function or emergency call state control function indicated by the returned address or identity;

the default emergency control function or default emergency call state control function selects an emergency control function or emergency call state control function and forwards the session to the selected emergency control function or emergency call state control function.

The computer program may implement the method so as to comprise at least one or more, in any arbitrary combination, of:

a proxy call state control function receives, from a user equipment, a message, e.g. an invite message, with an emergency indication, the message optionally containing location information of the user equipment;

the proxy call state control function forwards the message to a serving call state control function in an internet protocol multimedia subsystem network or home internet protocol multimedia subsystem network;

the proxy call state control function adds an address of the emergency call state control function to the message;

the proxy call state control function adds the emergency call state control function from the same network with proxy call state control function;

the serving call state control function executes originating services for a user;

the serving call state control function takes into account the fact that the session is for emergency, and executes the services in different manner than for regular sessions;

the serving call state control function then determines an address of the emergency call state control function;

in case the proxy call state control function has added the address of the emergency call state control function to the message sent to the serving call state control function, the serving call state control function uses this address;

in case there is no address of an emergency call state control function in the message sent from the proxy call state control function, the serving call state control function uses the location of the user equipment to determine the address of the emergency call state control function or an entry point to an alternative internet protocol multimedia subsystem core network where the emergency call state control function is located;

in case the serving call state control function is not able to determine the alternative internet protocol multimedia subsystem core network, the serving call state control function uses the emergency call state control function from the home internet protocol multimedia subsystem core network;

the emergency call state control function optionally verifies any location information from user equipment and optionally obtains additional location information;

based on this location information, the message or an invite message is sent to a media gateway control function or media gateway;

an initial address message is continued towards an emergency centre or public safety answering point;

a message or an invite message is sent directly to the emergency centre or public safety answering point;

the emergency call establishment is completed;

in case the emergency call state control function is not able to determine the public safety answering point address, the emergency call state control function rejects the emergency session request by sending a response message with a request for the user equipment to perform an internet protocol multimedia subsystem emergency registration.

The computer program may e.g. be embodied on a computer-readable medium.

At least one or more of the embodiments enable specific session or call service such as emergency service without requiring additional functionality from the access network, nor from the terminal.

Even if an access network does not support an access to an emergency call state control function or apparatus, and/or the terminal does not support or does not detect the emergency call, a session of the specific type such as emergency session may be properly handled or established.

In accordance with one or more embodiments of the invention, an access of the terminal or terminals to the network can be kept unchanged and the needed routing enhancements may be done between the home operator's network and the visited network's emergence-call access point. This emergency call access point may be an access point of any kind and will hereafter be called as default control function such as default emergency control function like a default emergency call state control function, default E-CSCF.

In accordance with one or more embodiments of the invention, a network is provided which comprises a default emergency control function and one or more emergency control functions or emergency call state control functions covering respective network areas for handling one or more emergency calls or sessions of a user equipment, the default emergency control function being configured to select one of the emergency call state control functions for handling an emergency session depending on location information of the user equipment.

Other objects, features and advantages of the invention will become apparent from the following description of embodiments of the invention.

DESCRIPTION OF EMBODIMENTS

In accordance with one or more embodiments, a service execution for emergency sessions or sessions of other specific types is provided.

Figure 1:
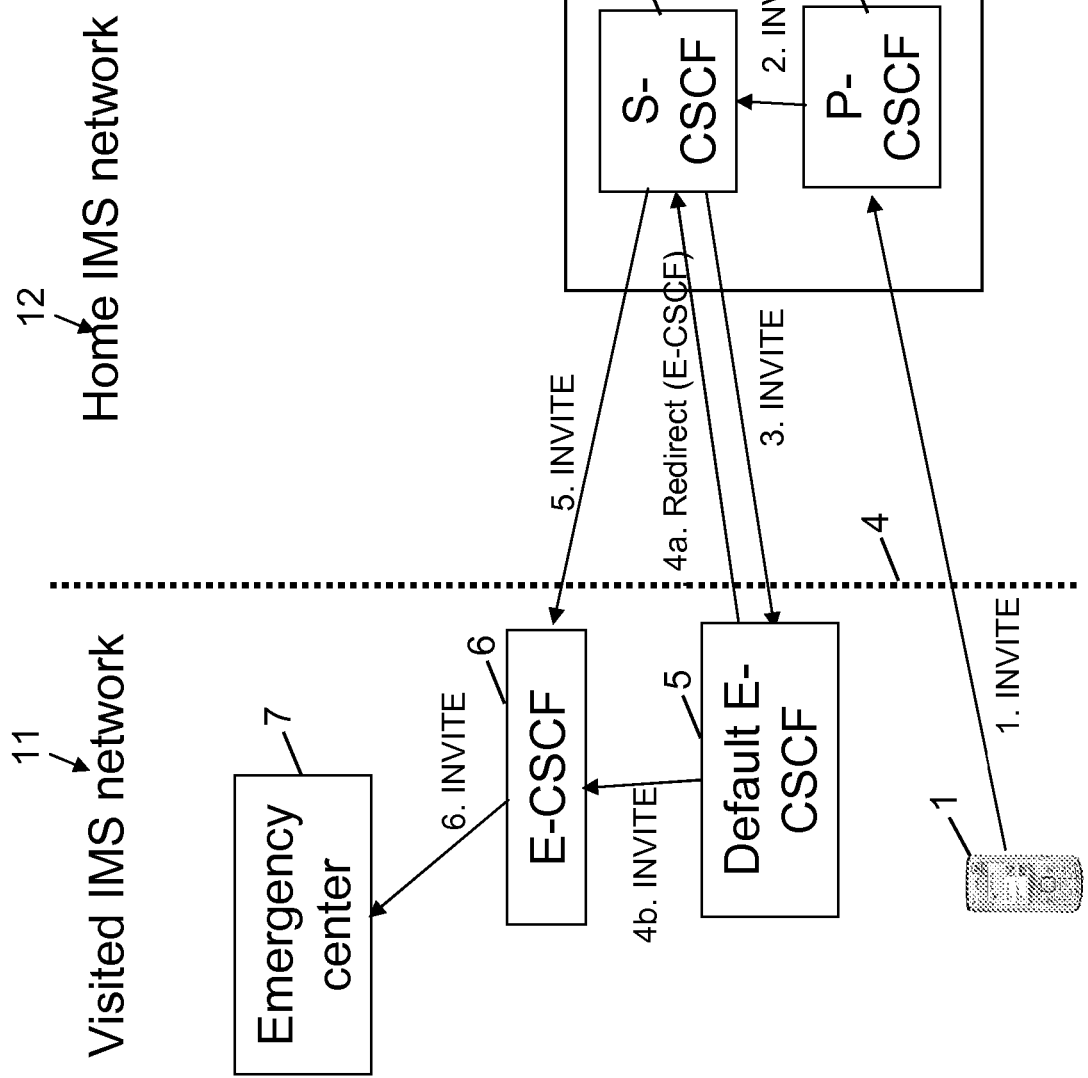
FIG. 1 illustrates an embodiment of a system and apparatuses in accordance with the invention.

FIG. 1 shows an embodiment in accordance with the invention which provides support of specific calls or sessions such as emergency call support in networks such as internet protocol based networks like an internet protocol multimedia subsystem according to release 7, R7 IMS, or other release version.

The home IMS network may be utilised, for example a proxy function or apparatus, e.g. proxy call state control function, P-CSCF, and a serving control function or apparatus, e.g. serving call state control function, S-CSCF, of the home network, to route the session or call request to a default control function or apparatus, e.g. E-CSCF, in the visited network. The default control function or apparatus such as default E-CSCF may reroute the request or may redirect the request back to the home network and may guide a serving control function or apparatus such as a serving control function, S-CSCF, to route the request to a proper emergency control function or apparatus, such as an E-CSCF, for handling the emergency calls from an area where a caller or user of the IP multimedia subsystem, IMS is currently located.

In accordance with one or more embodiments of the invention, a session of a specific type such as an emergency call or a high-priority call etc, may be routed normally via a proxy control function or apparatus, such as a proxy call state control function or apparatus, P-CSCF, and a serving call state control function or apparatus, S-CSCF, located in a home network.

As shown in FIG. 1, a user equipment 1 has roamed to a visited network 11 which may be a visited internet protocol multimedia subsystem network or a network of other type. When the user equipment 1 intends to set up a call or session, e.g. a session or call of a specific type such as an emergency call, the user equipment 1 sends, as shown in phase 1. INVITE, a session request to a proxy control function or apparatus such as proxy call state control function 2 located in a home network 12. The home network may be a home internet protocol multimedia subsystem network of the user of user equipment 1. The session request 1. may be transmitted via a border 4 between the home network 12 and the visited network 11. The illustrated name INVITE is a non-limiting example in accordance with the session initiation protocol, to which the invention is not limited.

The proxy control function 2 transmits a session request 2, such as a message or an invite request of a session initiation protocol, to a serving control function or apparatus such as a serving call state control function 3 of the home network 12.

As illustrated by message 3, the serving control function or apparatus 3 forwards the session request to a default emergency control function or apparatus 5 such as a default emergency call state control function of the visited network 11.

The default emergency control function 5 may return a redirect message 4a to the serving call state control function 3 indicating an address or identity etc of an emergency control function or apparatus 6 such as an emergency call state control function appropriate for handling or setting up the session. The serving call state control function 3 may then send a message 5. such as an invite message to the emergency call state control function 6 using the address, identity etc indicated in the message 4a.

As an alternative, the default emergency control function 5 may directly send a message 4b. such as an invite message to the emergency control function 6. In response to message 5. or 4b, the emergency control function 6 may send a message 6. such as an invite message to an emergency center 7 for informing the emergency center 7 on the emergency call or session requested by the user equipment 1 so as to provide the requested session or call to the user equipment 1.

In this or further embodiments, normal internet protocol multimedia subsystem routing capabilities may be used. The proxy call state control function 2 is in this embodiment assumed to be located in the home IMS network 12. The default emergency call state control function 5 may handle the incoming emergency calls and reroute or redirect the emergency calls to a correct emergency call state control function (E-CSCF 6 in this embodiment) which can handle the actual routing e.g. to a public safety answering point/ emergency center 7.

Figure 2:
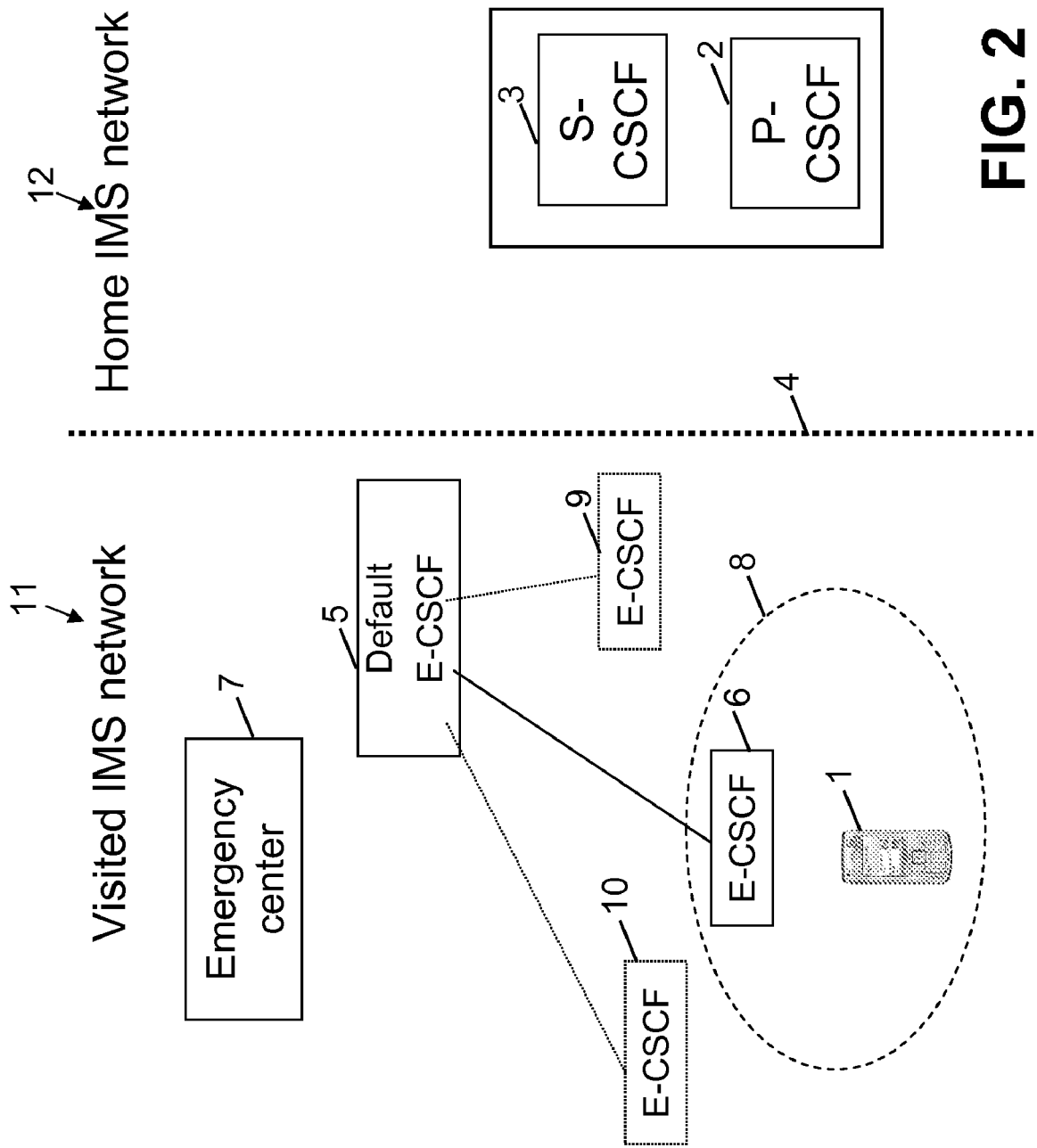
FIG. 2 shows an embodiment configured in accordance with an implementation of the invention.

FIG. 2 shows another embodiment in accordance with the invention, illustrating a scenario for the emergency call state control function, E-CSCF, functionality. The above explanation and statements regarding FIG. 1 apply to the embodiment of FIG. 2 as well. Same reference numerals are used in FIGS. 1, 2 for designating like entities. The phases 1. to 6. of FIG. 1 may also be provided in the embodiment of FIG. 2. FIG. 2 shows further emergency control functions or apparatuses 9, 10 which may be used for handling sessions such as emergency sessions, depending on the present location, connectivity or the like of the user equipment 1. The oval line 8 circumscribing user equipment 1 and emergency call state control function 6 indicates that emergency call state control function 6 is closest to, or covering the area of, the current location of user equipment 1 and is therefore suited for handling the session request 1 such as emergency session request of the user equipment 1.

An emergency call state control function, E-CSCF 6, 9, 10, may cover e.g. respective regional or geographical areas within which a user in distress is placing an emergency call.

Default E-CSCF 5 may handle a cluster of corresponding emergency call state control functions 6, 9, 10 handling those areas. The default E-CSCF 5 may act as a visited network emergency call contact/entry point. Further, the default E-CSCF 5 may assist to find the correct E-CSCF for the inbound emergency call.

The serving control function or apparatus 3 of FIGS. 1, 2 may detect that the call is an emergency call. The serving control function or apparatus 3 may route the request, e.g. via a proxy access network information such as P-Access-network info, to a default control function or apparatus such as emergency call state control function or apparatus, E-CSCF 5, in the network where the caller or internet protocol multimedia subsystem, IMS, user is located.

The serving call state control function or apparatus 3 may include a location information indicating the current location or area where the caller or user equipment 1 is presently located.

The emergency control function or apparatus such as emergency call state control function or apparatus, E-CSCF 5, may reroute the request to a correct emergency control function or apparatus such as to an emergency call state control function or apparatus handling emergency calls coming from the area 8 where the caller or user is presently located.

The emergency control function or apparatus 5 such as emergency call state control function or apparatus may in another embodiment redirect the request back to the serving control function or apparatus 3 such as serving call state control function or apparatus, S-CSCF, including a correct name or address, or a name and address, of an emergency control function or apparatus E-CSCF configured to handle one or more emergency calls for the area where the caller is currently located, or depending on other information such as priority of a user or subscriber, etc. The serving call state control function or apparatus 3 may then route the redirected request, or a new request, to the emergency control function or apparatus 6 as indicated in the redirected request received from the emergency control function or apparatus 5.

At least one or more of the embodiments advantageously reuse the existing originating IMS routing capabilities. In an internet protocol multimedia subsystem, IMS, the proxy call state control function or apparatus may be located in a visited or home network such as a home IMS network. In accordance with one or more embodiments, the home network, e.g. home IMS network, may be the starting point for specifying the emergency call or call or session of other specific type.

In accordance with one or more embodiments, a deployment scenario is provided where the proxy call state control function or apparatus such as P-CSCF is located in the IMS user's home network.

A call back number may be assigned to a user or caller which has initiated an emergency call or session. The call back number may be assigned so as to have an emergency registration or a so called emergency public user identity. The call back number may be assigned by an emergency center, EC, or a public services access point or public safety answering point, PSAP. This call back number may be used by the public services access point or public safety answering point when calling to the user or session initiator in distress.

In accordance with one or more embodiments, the serving control function or apparatus 3 such as serving call state control function or apparatus may add the call back number to the outgoing emergency request addressed to the default control function or apparatus 5.

An emergency architecture such as an internet protocol multimedia subsystem emergency architecture is, in accordance with one or more embodiments, implemented in such a way that service execution in home network, e.g. in a serving call state control function or apparatus, is possible.

In accordance with one or more embodiments, in case of a session forwarding such as an emergency call forwarding, e.g. an internet protocol multimedia subsystem, IMS, emergency call forwarding, the emergency sessions may be routed to the home network of the user, also called subscriber, e.g. to the home IMS network.

According to one or more embodiments, a serving function or apparatus of the home network such as the serving control function or apparatus of the home network, e.g. a home serving call state control function or apparatus, S-CSCF, is introduced between the proxy control function or apparatus such as proxy call state control function or apparatus, P-CSCF, and an emergency control function or apparatus such as an emergency call state control function or apparatus, E-CSCF.

The serving control function or apparatus such as S-CSCF, may then execute initial filter criteria, iFC, for the emergency sessions. The initial filter criteria may for example be stored in a home subscriber server, e.g. as part of user-related profile information and may be used to trigger service processing, for example by setting or arming triggers at the serving control function or apparatus, S-CSC. When a particular initial filter criteria, iFC, condition, occurs, the serving control function or apparatus may communicate with a respective application server designated by the filter criteria. Service logic may reside in the application server. The application server may invoke a desired service.

The one or more application servers get an indication that this session is for emergency, for example the service uniform resource name, URN, in the Request-uniform resource identifier, URI. Thus the application server or servers may execute the service in a manner different from regular sessions. Once the appropriate application server or servers have been contacted, the serving control function or apparatus such as serving call state control function or apparatus may route the session to the emergency control function or apparatus in the home network, or to the emergency control function or apparatus in the visited network.

In the following, one or more embodiments are described which provide IMS emergency call forwarding with serving call state control function or apparatus.

An internet protocol multimedia subsystem IMS emergency call forwarding with a serving control function or apparatus, e.g. S-CSCF, may be an extended solution which may have e.g. one or more or all of the following objectives and rationale.

If a subscriber does not have wireless access at the time an emergency call is dialed (e.g. the user has just powered on the phone before dialing) or if the user has access to a data only network without voice call capability (e.g. has internet access via a wireless local area network, WLAN) then the user's expectation of an emergency call succeeding and the legal requirements for some voice service providers, VSP, supporting the emergency call will both be significantly lower than if the user is already accessing a voice capable network (e.g. a 3GPP voice capable visited public land mobile network, VPLMN) at the time the emergency call is dialed. Embodiments support the above cases.

In many cases, the voice service provider VSP accessed by the user may not be local to the user's current location. For example, the user may be in a roaming situation and accessing the H-PLMN or some other remote VSP using direct IP access (e.g. from a WLAN or some other data only access network). In that case, the VSP may not be able to establish an emergency call to a suitable local public safety answering point, PSAP, and there may be no local VSP (e.g. 3GPP VPLMN) already being accessed to fall back to.

Embodiments provide solutions whereby a serving control function or apparatus may direct the call to a more suitable local emergency control function or apparatus without requiring a user equipment UE to perform a search.

In accordance with one or more embodiments, a home control function or apparatus such as a home proxy function like P-CSCF, does not reject the emergency session when the user equipment UE is roaming. Instead of routing the emergency session to an emergency call state control function or apparatus, E-CSCF, the proxy control function or apparatus forwards the session to the home serving control function or apparatus such as S-CSCF, which may then execute the emergency service related initial filter criteria, iFC, and then forward the session to the emergency call state control function or apparatus, E-CSCF, either in home or visited network (alternative IMS core).

Figure 3:
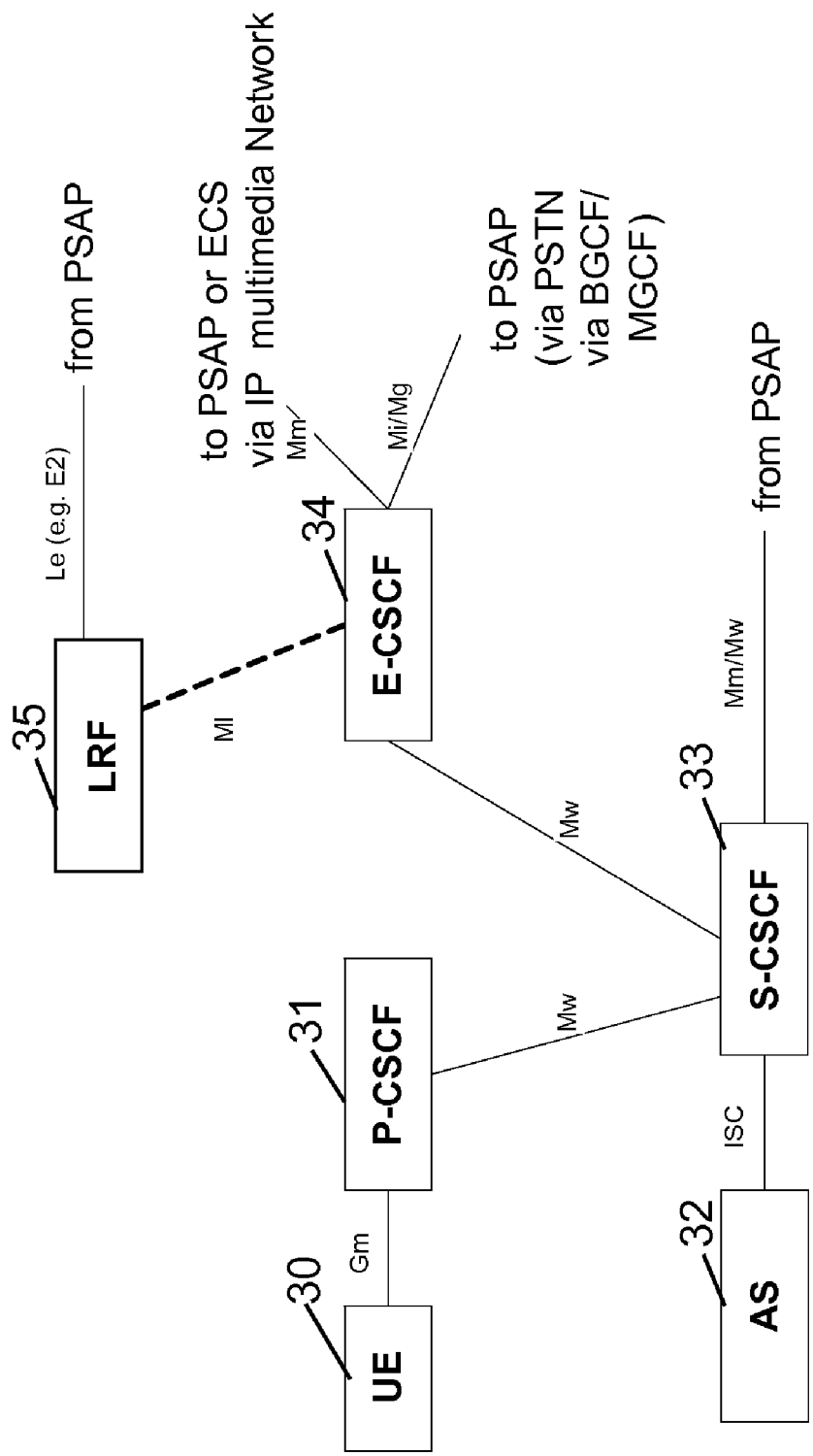
FIG. 3 illustrates another embodiment of the invention.

FIG. 3 illustrates architectural details of an IMS emergency call forwarding architecture in accordance with one or more embodiments of the invention. As shown in FIG. 3, a user equipment, UE 30, a proxy call state control function or apparatus, P-CSCF 31, a serving call state control function or apparatus, S-CSCF 33, an emergency call state control function or apparatus, E-CSCF 34, an application server, AS 32, and a location retrieval function, LRF 35, are provided which may communicate with each other or a public safety answering point, PSAP, as indicated by lines to and from or between the entities.

In the embodiment of FIG. 3, the proxy control function such as proxy call state control function or apparatus P-CSCF 31 may belong to the home network or to the visited network. The serving control function or apparatus or serving call state control function or apparatus, S-CSCF 33, may belong to the home IMS core network while the emergency control function or apparatus such as emergency call state control function or apparatus, E-CSCF 34, and the location retrieval function, LRF 35, may belong to the home network or to the network supporting IMS emergency calls at the current location of the user equipment 1.

The location retrieval function (LRF) may be responsible for retrieving the location information of the user equipment or terminal that has initiated an IMS emergency session. The location retrieval function may provide routing information to the emergency call state control function or apparatus for routing the emergency request. The public safety answering point may query the location retrieval function for location information and optionally for a callback number. Information provided by the location retrieval function to the emergency call state control function or apparatus may include routing information and other parameters necessary for emergency services, which may be subject to local regulation. In order to provide a correct public safety answering point destination address to the emergency call state control function or apparatus, the location retrieval function may require interim location information for the user equipment UE.

Figure 4:
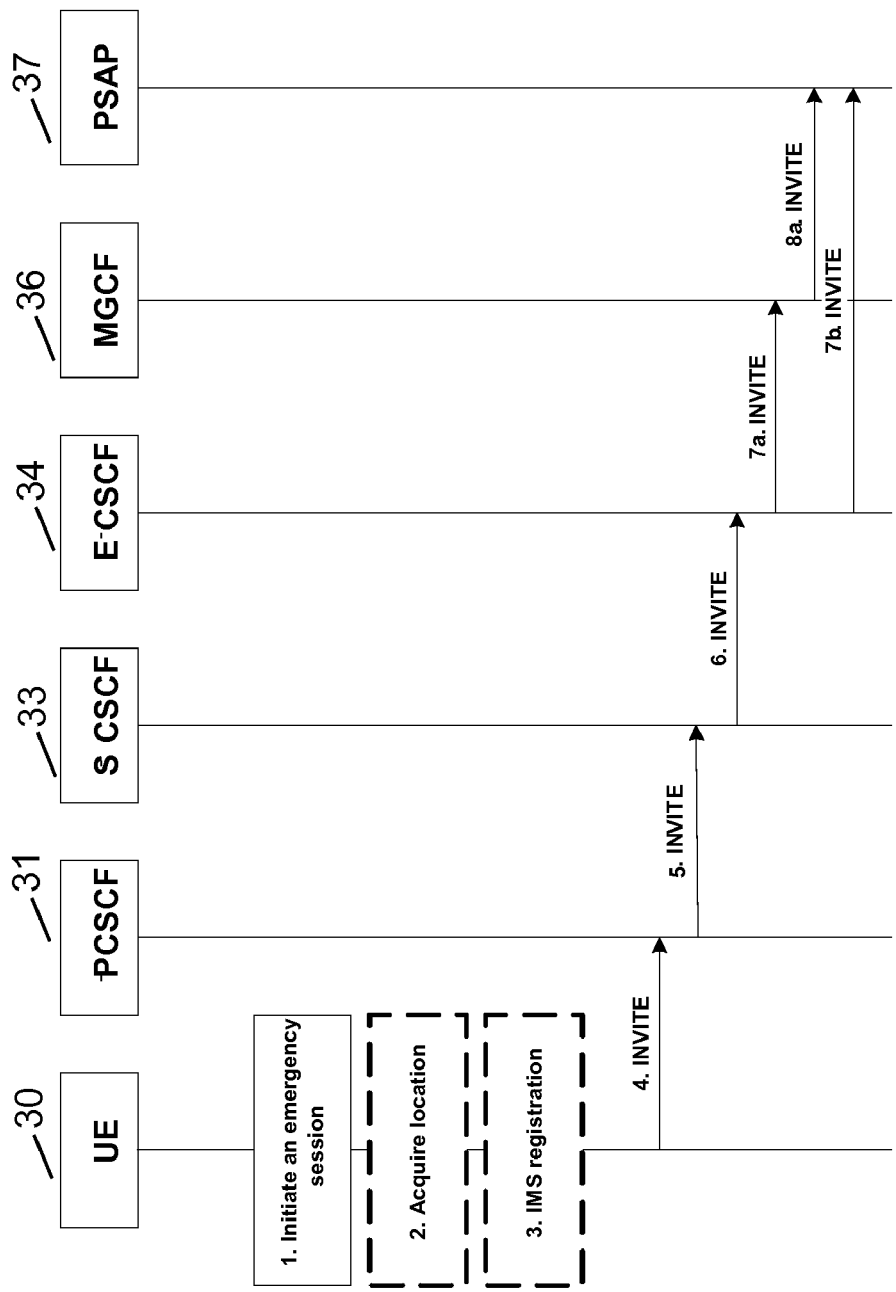
FIG. 4 shows a further embodiment in accordance with the invention.

FIG. 4 illustrates a further embodiment and shows information flows between the entities allowing IMS emergency call forwarding. The reference numerals added to the entities correspond to the reference numerals of the embodiment of FIG. 3 as far as appropriate.

In a process, phase or routine 1 of FIG. 4, the user or user equipment 30 initiates an emergency call.

In a process, phase or routine 2, the user equipment 30 determines its own location or location identifier or obtains location information from an internet protocol based controller area network, IP-CAN.

In a process, phase or routine 3, the user equipment 30 discovers the proxy call state control function or apparatus, P-CSCF 31, for instance according to a standard. The proxy call state control function or apparatus 31 may locate either in visited or home network. If not already registered to the internet protocol multimedia subsystem, IMS, the user equipment UE 30 may initiate an internet protocol multimedia subsystem registration with the home internet protocol multimedia subsystem, IMS, core by sending a message such as a session initiation protocol message like REGISTER to the proxy call state control function or apparatus P-CSCF 31. If so, the proxy call state control function or apparatus 31 continues the registration with the home IMS network.

The user equipment 30 sends, in a process or routine 4, a message such as an INVITE message or request of session initiation protocol with an emergency indication to the proxy call state control function or apparatus 31. The INVITE message may optionally contain any location information that the user equipment 30 has.

In a routine or process 5, the proxy call state control function or apparatus 31 forwards the INVITE request or message to the serving call state control function or apparatus, S-CSCF 33 in the home IMS network. The proxy call state control function or apparatus 31 adds the address of the emergency call state control function or apparatus E-CSCF 34 to the INVITE message sent in process 5 to the serving call state control function or apparatus 33. The proxy call state control function or apparatus 31 adds the emergency call state control function or apparatus 34 from the same network with P-CSCF 31.

In routine or process 6, the serving call state control function or apparatus, S-CSCF 33, executes the originating services for the user of user equipment 30. The serving call state control function or apparatus 33 may take into an account the fact that the session is for emergency, and execute the services in different manner than for regular sessions. The serving call state control function or apparatus 33 then determines the address of the emergency call state control function or apparatus, E-CSCF 34. In case the proxy call state control function or apparatus 31 added the address of the emergency call state control function or apparatus 34 to the INVITE in phase 5, the serving call state control function or apparatus 33 uses this address.

In case there is no E-CSCF address in the INVITE of phase 5, the serving call state control function or apparatus 33 uses the location of the user equipment 30 to determine the address of the emergency call state control function or apparatus E-CSCF 34 (or the entry point to the alternative IMS core network where the E-CSCF is located). In case the serving call state control function or apparatus 33 is not able to determine the alternative IMS core network (e.g. the IP-CAN does not have an IMS core network), the serving call state control function or apparatus 33 uses the emergency call state control function or apparatus, E-CSCF, from the home IMS core network.

In a phase 7, the emergency call state control function or apparatus E-CSCF 34 may verify any location information from user equipment 30 and may obtain additional location information (e.g. from an associated location retrieval function, LRF).

Based on this location information, an invite request 7a may be sent to an media gateway control function, MGCF, 36 or to a media gateway, MGW, and in phase 8a, an initial address message, IAM may be continued towards the emergency centre or public safety answering point, PSAP 37. As an alternative, as shown by message 7b, the INVITE request may be sent directly to the emergency centre or public safety answering point, PSAP 37. The emergency call establishment is completed.

In case the emergency call state control function or apparatus 34 is not able to determine the address of the public safety answering point 37, e.g. due to lack of location information, the emergency call state control function or apparatus 34 rejects the emergency session request, e.g. by sending a 380 response of session initiation protocol with the request for the user equipment 30 to perform an IMS emergency registration.

In accordance with this or one or more other embodiments of the invention, the serving call state control function or apparatus 33 is involved in the emergency session. This enables service execution for emergency sessions. In addition, the IMS emergency registration is not mandated here, even if the user equipment 30 is roaming, it may use the existing IMS registration for emergency sessions. This speeds up the emergency session establishment. On the other hand, this solution is applicable also with an IMS emergency registration; in case the home IMS core network is not able to find a proper emergency call state control function or apparatus E-CSCF in alternative IMS core network, and the home emergency call state control function or apparatus, E-CSCF, is not able to find the proper public safety answering point, PSAP, then the emergency session attempt is rejected, and the user equipment 30 performs an IMS emergency registration. Also the emergency session attempt which uses the IMS emergency registration is routed to the serving call state control function or apparatus, S-CSCF, in the home network.

Regarding the selection of the alternative IMS core, in this embodiment the serving call state control function or apparatus, S-CSCF 33, selects the proper emergency call state control function or apparatus, E-CSCF (or an entry point to the network where the emergency call state control function or apparatus is located). Thus a new E-CSCF-E-CSCF interface between the networks is not required. The serving call state control function or apparatus may use the regular interface to the visited emergency call state control function or apparatus, E-CSCF, via an interrogating call state control function or apparatus, I-CSCF.

The procedure defined in this or other embodiments is also applicable to a user equipment that has not recognized an emergency call since the forwarding can be transparent to the user equipment.

The procedure defined in this or other embodiments may also be applicable internationally, e.g. in a case that IMS core 1 and IMS core 2 belong to two different countries, provided that agreements exist.

In this embodiment the proxy call state control function or apparatus, P-CSCF, located in the home network optionally does not reject the emergency session when the user equipment is roaming. This same option applies also to one or more of the other embodiments. In addition, the proxy call state control function P-CSCF 31 may optionally be able to add the address of the emergency call state control function or apparatus to the initial request, and route the emergency session to the serving call state control function or apparatus in the home network.

The serving call state control function or apparatus, S-CSCF, may be enhanced to be able to execute services for emergency sessions. The serving call state control function or apparatus may execute the service in different manner than for regular sessions, based on the explicit emergency indicator in the initial request. In addition, the serving call state control function or apparatus may determine the address of the emergency call state control function or apparatus and may route the emergency session there. There is no need for impact to the E-CSCF.

Figure 5:
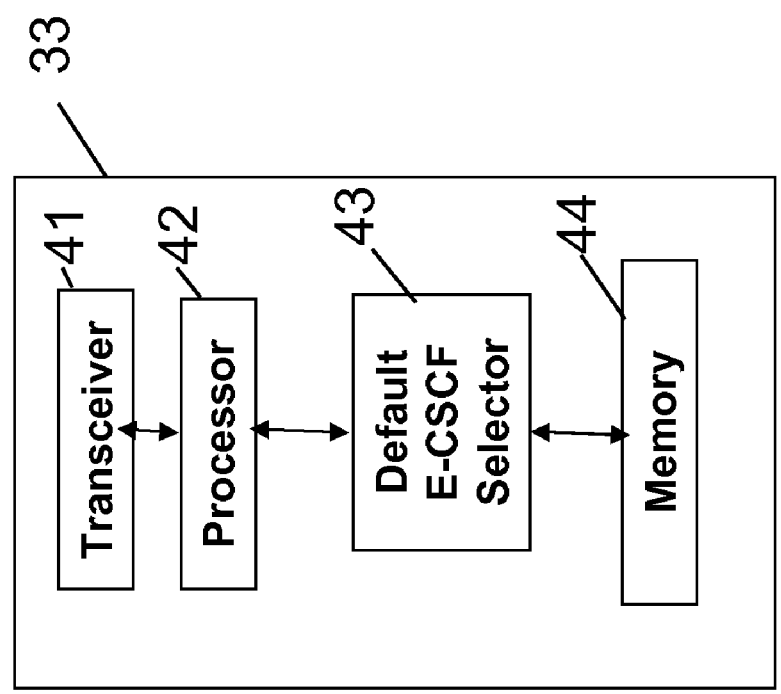
FIG. 5 illustrates another embodiment of the invention.

FIG. 5 illustrates an embodiment of an apparatus in accordance with the invention. The embodiment of FIG. 5 may be a serving call state control function 3 of FIGS. 1, 2, or 33 of FIGS. 3, 4, or a part, module or chipset of such a serving control function. The apparatus 33 comprises a transceiver 41 for transmitting and/or receiving signals, a processor 42 for at least one of processing data or controlling part or all of the apparatus 33; a default emergency call state control function selector 43 for selecting a default emergency call state control function when the apparatus should receive information on an emergency call or session of other specific type, e.g. from a proxy control function, to be set up for a user equipment. Further, a memory 44 is provided for storing at least one or more of information on default emergency call state control functions, program instructions, etc.

Figure 6:
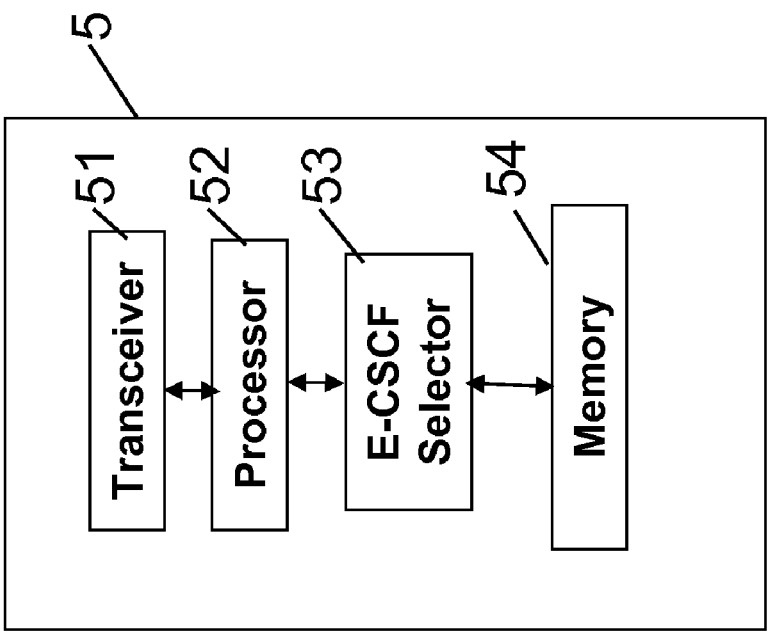
FIG. 6 shows a further embodiment in accordance with the invention.

FIG. 6 shows an embodiment of another apparatus in accordance with the invention. The embodiment of FIG. 6 may be a default emergency control function, e.g. emergency call state control function 5 of FIGS. 1, 2, or a part, module or chipset of such a default control function. The apparatus 5 comprises a transceiver 51 for transmitting and/or receiving signals, a processor 52 for at least one of processing data or controlling part or all of the apparatus 5; an emergency call state control function selector 43 for selecting an appropriate emergency call state control function when the apparatus should receive information on an emergency call or session of other specific type, e.g. from a serving control function, to be set up for a user equipment. Further, a memory 54 is provided for storing at least one or more of information on available emergency call state control functions, program instructions, etc.

In accordance with one or more embodiments of the invention, in addition to at least one internet protocol multimedia subsystem network, an evolved packet system, EPS, architecture may be provided which may comprise, a serving GPRS, general packet radio service, support node, SGSN, a mobility management entity, MME, for managing mobility, user equipment identities and security parameters, a UMTS terrestrial radio access network, UTRAN, a GERAN, GSM/EDGE, Enhanced Data rate for GSM Evolution, radio access network, E-UTRAN, a serving gateway e.g. for terminating an interface towards E-UTRAN, a PDN gateway being a node that terminates an SGi interface towards a packet data network, PDN, a PCRF, and operator's IP services (e.g. IMS, PSS etc.).

For the purpose of the present invention as described herein above, it should be noted that any access or network technology may be used which may be any technology by means of which a user equipment can access or communicate with a network. The network may be any device, unit or means by which a mobile or stationary entity or other user equipment may connect to and/or utilize services offered by the network. Such services may include, among others, data and/or (audio-) visual communication, data download etc.

Generally, the present invention is also applicable in those network/terminal environments relying on a data packet based transmission scheme according to which data are transmitted in data packets and which are for example based on the Internet Protocol IP. The present invention is, however, not limited thereto, and any other present or future IP or mobile IP version, or, more generally, a protocol following similar or other principles is also applicable. The user equipment entity may be any device, unit or means by which a system user may experience services from a network.

The sequence of method phases described above or shown in the drawings can be implemented in any other sequence arbitrarily deviating from the above described or shown sequence of phases. Further, the method, apparatuses and devices, may include only one, more or all of the features described above or shown in the drawings, in any arbitrary combination.

The method phases or functions or apparatuses may be implemented as software code portions and be run using a processor at a network element or terminal, can be software code independent, and/or can be specified using any known or future developed programming language as long as the functionality defined by one or more of the method phases or functions is preserved. Generally, any method phase is suitable to be implemented as software or by hardware without changing the idea of the present invention in terms of the functionality implemented.

Devices, apparatus, units, or means, and/or method phases may be implemented as hardware components of a stationary or mobile station, or a terminal, or a network element, or part, or chipset, or module thereof, which part, or chipset, or module e.g. be used for an apparatus; may be hardware independent; and may be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. Devices, apparatus, units or means (e.g. User equipment, CSCF) can be implemented as individual devices, units, means, chipsets, modules, or part of devices, and may also be implemented in a distributed fashion throughout a system, as long as the functionality of the device, unit or means is preserved.

The invention claimed is:

1. An apparatus, comprising
a processor configured to receive from a proxy apparatus a session request for initiating an emergency session pertaining to a device in a visited network for which the apparatus is a home network apparatus, and determine or select a default emergency control function or apparatus in the visited network, a sender configured to send an emergency session request, or forward the emergency session request, to the default emergency control function or apparatus, and a receiver configured to receive from the default emergency control function or apparatus an address or identity of an emergency control function or apparatus in the visited network to which to send a message regarding the setting up of the emergency session.

2. The apparatus of claim 1, wherein the processor is configured to receive the session request from a proxy apparatus in a home network of the device.

3. The apparatus of claim 1, wherein the processor is configured to receive the session request from a proxy apparatus in the visited network of the device.

4. The apparatus of claim 1, wherein the session request is an emergency session request or emergency call request.

5. The apparatus of claim 1, comprising at least one or more of: the apparatus is at least one of a serving control function or apparatus, a serving function or apparatus of an internet protocol multimedia subsystem, a serving call state control function, or a part, module or chipset of a serving control function, the apparatus is configured to receive the session request from a proxy control function or proxy call state control function.

6. An apparatus, comprising processor configured to receive an emergency session or call request for initiating an emergency session or emergency call pertaining to a device in a visited network, a sender configured to forward the emergency session or call request to a serving control function or apparatus of a home network, said serving control function or apparatus configured to send or forward the emergency session request to a default emergency control function or apparatus of the visited network and to receive from the default emergency control function or apparatus an address or identity of an emergency control function or apparatus in the visited network to which to send a message regarding the setting up of the emergency session.

7. The apparatus of claim 6, comprising at least one or more of:

the apparatus is at least one of a proxy control function or apparatus, a proxy function or apparatus of an interne protocol multimedia subsystem, a proxy call state control function, or a part, module or chipset of a proxy control function or proxy call state control function.

8. An apparatus, comprising a processor configured to receive a session request for initiating an emergency session pertaining to a device in a visited network, the processor being an apparatus of the visited network and the session request being received from a control function or apparatus of a home network of the device, and determine or select an emergency control function or apparatus of the visited network, and a sender configured to return a message or session request to the control function or apparatus of the home network indicating an address or identity of the selected or determined emergency control function or apparatus.

9. The apparatus of claim 8, comprising at least one or more of: the apparatus is at least one of a default control function or apparatus, a default function or apparatus of an internet protocol multimedia subsystem, a default emergency call state control function, or a part, module or chipset of an emergency control function or apparatus.

10. A method, comprising receiving from a proxy apparatus a session request for initiating an emergency session pertaining to a device in a visited network for which the apparatus is a home network apparatus, determining or selecting a default emergency control function or apparatus in the visited network, sending an emergency session request, or forwarding the emergency session request, to the default emergency control function or apparatus, and receiving from the default emergency control function or apparatus an address or identity of an emergency control function or apparatus in the visited network to which to send a message regarding the setting up of the emergency session.

11. A method, comprising receiving an emergency session or call request for initiating an emergency session or emergency call pertaining to a device in a visited network, forwarding the emergency session or call request to a serving control function or apparatus of a home network, sending or forwarding from said serving control function or apparatus the emergency session request to a default emergency control function or apparatus of the visited network, and receiving from the default emergency control function or apparatus an address or identity of an emergency control function or apparatus in the visited network to which to send a message regarding the setting up of the emergency session.

12. A method, comprising a proxy call state control function receives, from a user equipment located in a visited network, a message with an emergency indication, the message optionally containing location information of the user equipment, the proxy call state control function being resident in a home network of the user equipment;

the proxy call state control function forwards the message to a serving call state control function in an internet protocol multimedia subsystem network or home internet protocol multimedia subsystem network;

the serving call state control function sends an INVITE message to a default emergency control function resident in the visited network;

the serving call state control function receives in reply from the default emergency control function a REDIRECT message containing an address of an emergency control function resident in the visited network; and the serving call state control function sends an INVITE message to the emergency control function using the address received in the REDIRECT message.

13. The method of claim 12, comprising at least one or more, in any arbitrary combination, of: the serving call state control function executes originating services for the user equipment;

the serving call state control function takes into account the fact that the session is for emergency, and executes the services in different manner than for regular sessions.

14. The method of claim 12, comprising at least one or more, in any arbitrary combination, of: in case the serving call state control function is unable to determine an alternative internet protocol multimedia subsystem core network, the serving call state control function uses an emergency call state control function from a home internet protocol multimedia subsystem core network; the emergency call state control function optionally verifies any location information for the user equipment and optionally obtains additional location information; based on this location information, the message is sent to a media gateway control function or media gateway; an initial address message is continued towards an emergency center or public safety answering point; a message is sent directly to the emergency center or public safety answering point; and the emergency call establishment is completed.

15. The method of claim 14, comprising at least one or more, in any arbitrary combination, of: in case the emergency call state control function is not able to determine the public safety answering point address, the emergency call state control function rejects the emergency session request by sending a response message with a request for the user equipment to perform an internet protocol multimedia subsystem emergency registration.

16. A system, comprising
at least one or more, in any arbitrary combination, of: a proxy call state control function configured to receive, from a user equipment located in a visited network, a message with an emergency indication, the message optionally containing location information of the user equipment, the proxy call state control function being resident in a home network of the user equipment;
the proxy call state control function configured to forward the message to a serving call state
control function in an internet protocol multimedia subsystem network or home internet protocol multimedia subsystem network;
the serving call state control function is configured to send an INVITE message to a default emergency control function resident in the visited network;
the serving call state control function is further configured to receive in reply from the default emergency control function a REDIRECT message containing an address of an emergency control function resident in the visited network; and
the serving call state control function is further configured to send an INVITE message to the emergency control function using the address received in the REDIRECT message.

17. The system of claim 16, comprising at least one or more, in any arbitrary combination, of: the serving call state control function configured to execute originating services for the user equipment;
the serving call state control function configured to take into account the fact that the session is for emergency, and execute the services in different manner than for regular sessions.

18. A non-transitory computer readable medium comprising a computer program, comprising code means configured to carry out or implement, when run on a processor, a method comprising at least one or more, in any arbitrary combination, of:
a home proxy control function, or home proxy call state control function, forwards an emergency session related to a user equipment located in a visited network to a home serving control function, or a home serving call state control function;
the home serving control function or home serving call state control function, executes emergency service related initial filter criteria; the home serving control function, or home serving call state control function, forwards the session to a default emergency control function located in the visited network, an emergency call state control function, a default emergency control function, or a default emergency call state control function;
the default emergency control function or default emergency call state control function returns an address or identity of an emergency control function or emergency call state control function located in the visited network;
the serving call state control function or serving call state control function sends an emergency session request to the emergency control function or emergency call state control function indicated by the returned address or identity.

19. An apparatus, comprising
means for receiving from a proxy apparatus a session request for initiating an emergency session pertaining to a device in a visited network for which the apparatus is a home network apparatus,
means for determining or selecting a default emergency control function or apparatus in the visited network,
means for sending a session request, or forwarding the session request, to the default emergency control function or apparatus, and
means for receiving from the default emergency control function or apparatus an address or identity of an emergency control function or apparatus in the visited network to which to send a message regarding the setting up of the emergency session.

20. The apparatus of claim 19, comprising at least one or more of: the apparatus is at least one of a serving control function or apparatus, a serving function or apparatus of an internet protocol multimedia subsystem, a serving call state control function, or a part, module or chipset of a serving control function.

* * * * *